United States Patent
Jasinska-Walc et al.

(10) Patent No.: US 10,557,026 B2
(45) Date of Patent: Feb. 11, 2020

(54) COMPOSITION COMPRISING POLYPROPYLENE, POLYETHYLENE, AND A COMPATILIZER

(71) Applicant: SABIC Global Technologies B.V., Bergen op Zoom (NL)

(72) Inventors: Lidia Jasinska-Walc, Eindhoven (NL); Robbert Duchateau, Eindhoven (NL); Miloud Bouyahyi, Eindhoven (NL); Piotr Wisniewski, Geleen (NL); Marta Urszula Przybysz, Geleen (NL); Mateusz Krzysztof Kozak, Geleen (NL); Magdalena Malec, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 155 days.

(21) Appl. No.: 15/576,336

(22) PCT Filed: May 18, 2016

(86) PCT No.: PCT/EP2016/061112
§ 371 (c)(1),
(2) Date: Nov. 22, 2017

(87) PCT Pub. No.: WO2016/188817
PCT Pub. Date: Dec. 1, 2016

(65) Prior Publication Data
US 2018/0179368 A1 Jun. 28, 2018

(30) Foreign Application Priority Data
May 22, 2015 (EP) .................................... 15169059

(51) Int. Cl.
*C08L 23/12* (2006.01)
*C08L 23/06* (2006.01)
*C08L 67/04* (2006.01)

(52) U.S. Cl.
CPC .............. *C08L 23/12* (2013.01); *C08L 23/06* (2013.01); *C08L 2205/02* (2013.01); *C08L 2205/03* (2013.01); *C08L 2205/08* (2013.01); *C08L 2207/066* (2013.01)

(58) Field of Classification Search
USPC ........................................................ 525/190
See application file for complete search history.

(56) References Cited

U.S. PATENT DOCUMENTS

| | | | |
|---|---|---|---|
| 5,693,710 | A | 12/1997 | Srinivasan et al. |
| 6,114,443 | A | 9/2000 | Lohse et al. |
| 2007/0254119 | A1 | 11/2007 | Lloyd-George et al. |
| 2017/0349710 | A1 | 12/2017 | Jasinska-Walc et al. |
| 2018/0148571 | A1 | 5/2018 | Duchateau et al. |
| 2018/0163035 | A1 | 6/2018 | Duchateau et al. |

FOREIGN PATENT DOCUMENTS

| | | |
|---|---|---|
| DE | 102005025017 A1 | 12/2006 |
| EP | 3015503 A1 | 5/2016 |
| EP | 3034547 A1 | 6/2016 |
| WO | 2012065711 A1 | 5/2012 |
| WO | 2014147546 A1 | 9/2014 |
| WO | 2014188344 A1 | 11/2014 |
| WO | 2014203209 A1 | 12/2014 |

OTHER PUBLICATIONS

Becquart et al., "Poly[ethylene-co-(vinyl alcohol)]-graft-poly-(ε-caprolactone) Synthesis by Reactive Extrusion, 1—Structural and Kinetic Study" Macromol. Mater. Eng. 2009, 294, 643-650.
Bisht et al., "Enzyme-Catalyzed Ring-Opening Polymerization of ω-Pentadecalactone," Macromolecules 1997, 30, 2705-2711.
Bouyahyi et al., "Metal-Based Catalysts for Controlled Ring-Opening Polymerization of Macrolactones: High Molecular Weight and Well-Defined Copolymer Architectures," Macromolecules 2014, 47, 517-524.
Bouyahyi et al., "ω-Pentadecalactone Polymerization and ω-Pentadecalactone/ε-Caprolactone Copolymerization Reactions Using Organic Catalysts," Macromolecules 2012, 45, 3356-3366.
Fokou et al., "Studying and Suppressing Olefin Isomerization Side Reactions During ADMET Polymerizations," Macromol. Rapid Commun. 2010, 31, 368-373.
Hunsen et al., "Humicola insolens Cutinase-Catalyzed Lactone Ring-Opening Polymerizations: Kinetic and Mechanistic Studies," Biomacromolecules 2008, 9, 518-522.
International Search Report for International Application No. PCT/EP2016/061112; International Filing Date: May 18, 2016; dated Aug. 1, 2016; 5 Pages.
Jasinska-Walc et al., "Topical behavior mimicking ethylene-hexene copolymers using branched lactones and macrolactones," Polym. Chem., 2014, 5, 3306.
Jedlinski et al., "Anionic polymerization of pentadecanolide. A new route to a potentially biodegradable aliphatic polyester," Macromol. Chem. Phys. 197,2923-2929 (1996).
Kumar et al., "Efficient Ring-Opening Polymerization and Copolymerization of ε-Caprolactone and ω-Pentadecalactone Catalyzed by Candida antartica Lipase B," Macromolecules 2000, 33, 6303-6309.
Liu et al., "Polymers from Fatty Acids: Poly(ω-hydroxyl tetradecanoic acid) Synthesis and Physico-Mechnical Studies" Biomacromolecules 2011, 12, 3291-3298.
Machine Translation of DE102005025017; Date of Publication: Dec. 7, 2006; 26 Pages.
Mahapatro et al., "Mild, Solvent-Free ω-Hydroxy Acid Polycondensations Catalyzed by Candida antarctica Lipase B," Biomacromolecules 2004, 5, 62-68.
Mu et al., "Synthesis of Amphiphilic Linear-Hyperbranched Graft-Copolymers via Grafting Based on Linear Polyethylene Backbone," Journal of Polymer Science, Part A: Polymer Chemistry 2014, 52, 2146-2154.

(Continued)

*Primary Examiner* — Fred M Teskin
(74) *Attorney, Agent, or Firm* — Cantor Colburn LLP

(57) ABSTRACT

The present invention relates to a composition comprising polypropylene, polyethylene and a compatibiliser, wherein said compatibiliser is a non-aromatic polyester having an average M/E ratio of at least 10, wherein M is the number of backbone carbon atoms in the polyester not including the carbonyl carbons and E is the number of ester groups in the polyester.

20 Claims, 1 Drawing Sheet

(56) References Cited

OTHER PUBLICATIONS

Pepels et al., "From Polyethylene to Polyeseter: Influence of Ester Groups on the Physical Properties," Macromolecules 2013, 46, 7668-7677.
Pillai et al., Tailored Nanostructuring of End-Group-Functionalized High-Density Polyethylene Synthesized by an Efficient Catalytic Version of Ziegler's "Aufbaureaktion" Chem. Eur. J. 2012, 18, 13974-13978.
Tzeng et al., "Stereoregular Diblock Copolymers of Syndiotactic Polypropylene and Polyesters: Syntheses and Self-Assembled Nanostructures" Macromolecules 2009, 72, 3073-3085.
Van der Meulen et al., "Catalytic Ring-Opening Polymerization of Renewable Macrolactones to High Molecular Weight Polyethylene-like Polymers," Macromolecules 2011, 44, 4301-4305.
Vilela et al., "Plant Oil-Based Long-Chain C26 Monomers and Their Polymers," Macromol. Chem. Phys. 2012, 213, 2220-2227.
Wilson et al., "'Immortal' ring-opening polymerization of ω-pentadecalactone by Mg(BHT)2(THF)2," Polym. Chem., 2014, 5, 2691.
Wilson et al., "Synthesis of ω-Pentadecalactone Copolymers with Independently Tunable Thermal and Degradation Behavior," Macromolecules 2015, 48, 950-958.
Written Opinion of the International Searching Authority for International Application No. PCT/EP2016/061112; International Filing Date: May 18, 2016; dated Aug. 1, 2016; 5 Pages.
Yang et al., "Two-Step Biocatalytic Route to Biobased Functional Polyesters from ω-Carboxy Fatty Acids and Diols," Biomacromolecules 2010, 11, 259-268.

COMPOSITION COMPRISING POLYPROPYLENE, POLYETHYLENE, AND A COMPATILIZER

CROSS REFERENCE TO RELATED APPLICATIONS

This application is a 371 of International Application No. PCT/EP2016/061112, filed May 18, 2016, which is incorporated herein by reference in its entirety, and which claims priority to European Application No. 15169059.1, filed May 22, 2015.

The present invention relates to a composition comprising polypropylene, polyethylene and a compatibiliser.

Compositions of polypropylene and polyethylene are desirable as they potentially allow tuning of the material properties by selecting the type and amounts of the individual components. However, it is well known that polyethylene and polypropylene are immiscible. It is further a disadvantage that polypropylene and polyethylene substantially do not interact so that a blend of polyethylene and polypropylene generally results in a two phase system having a polypropylene phase and a polyethylene phase with poor physical properties.

Accordingly attempts have been made to increase the interaction between the phases in such blends by adding a compatibiliser. Compatibilisers are materials that have affinity with both phases and enhance the bonding strength. As a result, a material with improved properties can be obtained.

Blends of polypropylene and polyethylene comprising a compatibiliser are known in the art. For example U.S. Pat. No. 6,114,443 discloses a composition comprising a blend of polyethylene and an isotactic poly-alpha-olefin homopolymer (such as polypropylene), together with a diblock copolymer compatibiliser of polyethylene block and an atactic poly-alpha-olefin block. The diblock compatibiliser of this US patent may be prepared using sequential polymerisation of the monomers for each block in the presence of a metallocene catalyst.

In view of the advantageous combination of mechanical properties, chemical properties and cost there is a continuous need for further compositions that can be manufactured relatively easy and with low cost.

It is therefore an object of the present invention to provide for a composition comprising polypropylene and polyethylene, which composition has a good balance of mechanical properties.

It is a further object of the present invention to provide a polyolefin based composition with improved printability.

Accordingly the present invention relates to a composition comprising polypropylene, polyethylene and a compatibiliser, wherein said compatibiliser is a non-aromatic polyester having an average M/E ratio of at least 10, wherein M is the number of backbone carbon atoms in the polyester not including the carbonyl carbons and E is the number of ester groups in the polyester.

Figure 1A:
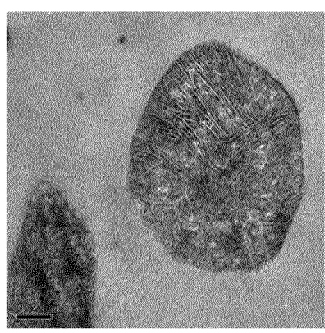
FIG. 1a shows a blend of PP with PPDL in an 80/20 mixture.

The present inventors have found that non-aromatic polyesters having an average M/E ratio of at least 10, wherein M is the number of backbone carbon atoms in the polyester not including the carbonyl carbons and E is the number of ester groups in the polyester, show a compatibilising effect when used in relatively low amounts in compositions comprising polyethylene and polypropylene. The present inventors in particular observed that these polyesters may, at least in part, co-crystallise with the polyethylene crystals in the polyethylene phase, and/or may crystallise epitaxially onto polyethylene crystals in the polyethylene phase. The inventors also observed that the polyester shows interaction with polypropylene. In line with these observations the present inventors found that the properties of the polyethylene-polypropylene blend are improved by addition of a relatively small amount of the polyester as herein defined. This finding is quite surprising given that polyethylene and polypropylene generally do not, or at least not significantly interact. Further, since the polyester compatibiliser will introduce a certain polarity in the material, the printability is improved such that pre-treatment prior to printing can be avoided or is at least reduced in intensity.

By application of the invention at least some of the aforementioned objects are met.

Polyester

The polyester in the composition according to the present invention is a non-aromatic polyester having an average M/E ratio of at least 10, wherein M is the number of backbone carbon atoms in the polyester not including the carbonyl carbons and E is the number of ester groups in the polyester. With average M/E ratio is meant a numerical average.

The polyester is non-aromatic meaning the polyester does not contain aromatic groups.

The backbone of the polyester is preferably saturated meaning it preferably does not contain any double bonds. It is preferred the backbone of the polyester is aliphatic. The polyester backbone may, in an embodiment, contain short aliphatic branches such as methyl, ethyl, propyl, butyl, pentyl or hexyl branches. The amount of such branches is preferably kept at a low amount since it may negatively affect the (co)crystallisation behaviour of the polyester block. In another embodiment the backbone contains one or more heteroatoms such as oxygen, nitrogen or sulfur.

The polyester may be a polyester homopolymer or a polyester copolymer.

If the polyester is a polyester copolymer then the number of backbone carbon atoms between two neighbouring ester groups in the backbone is preferably randomly distributed over the polyester. Furthermore the number of backbone carbon atoms (M) between ester functionalities in polyester copolymers is preferably at least 8, more preferably at least 10, or at least 12.

Typical examples of polyester homopolymers include the hompolymers obtainable by the ring opening polymerisation of dodecalactone, tridecanolactone, tetradecalactone, pentadecalactone, hexadecalactone, heptadecalactone, octadecalactone, nonadecalactone, ambrettolide, globalide. In other words typical examples of polyester homopolymers include polydodecalactone, polytridecanolactone, polytetradecalactone, polypentadecalactone, polyhexadecalactone, polyheptadecalactone, polyoctadecalactone, polynonadecalactone, polyambrettolide, polyglobalide.

Typical examples of polyester copolymers include copolymers of at least two lactones from a group including dodecalactone, tridecanolactone, tetradecalactone, pentadecalactone, hexadecalactone, heptadecalactone, octadecalactone, nonadecalactone, ambrettolide, globalide, valerolactone, caprolactone, massoia lactone, δ-decalactone, ε-decalactone, 13-hexyloxacyclotridec10-en-2-one, 13-hexyloxacyclotridecan-2-one.

Other typical examples of polyester copolymers include AABB type copolyesters prepared of a combination of $C_2$-$C_{30}$ diols and $C_2$-$C_{32}$ diacids provided the polyester copolymer has an average M/E of at least 10. Further it is preferred that the M/E ratio for the copolymers is at least 8. The term $C_x$ refers to the total amount of carbon atoms x in the diol or diacid respectively.

Diols include, but are not limited to, ethylene glycol, propane-1,3-diol, butane-1,4-diol, pentane-1,5-diol, hexane-1,6-diol, heptane-1,7-diol, octane-1,8-diol, nonane-1,9-diol, decane-1,10-diol, undecane-1,11-diol, dodecane-1,12-diol, tridecane-1,13-diol, tetradecane-1,14-diol, pentadecane-1,15-diol, hexadecane-1,16-diol, heptadecane-1,17-diol, octadecane-1,18-diol, nonadecane-1,19-diol, icosane-1,20-diol, henicosane-1,21-diol, docosane-1,22-diol, tricosane-1,23-diol, tetracosane-1,24-diol, pentacosane-1,25-diol, hexacosane-1,26-diol, heptacosane-1,27-diol, octacosane-1,28-diol, nonacosane-1,29-diol, triacontane-1,30-diol as well as their unsaturated and branched analogues.

Diacids include, but are not limited to oxalic acid, malonic acid, succinic acid, glutaric acid, adipic acid, heptanedioic acid, octanedioic acid, nonanedioic acid, decanedioic acid, undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, icosanedioic acid, henicosanedioic acid, docosanedioic acid, trocosanedioic acid, tetracosanedioic acid, pentacosanedioic acid, hexacosanedioic acid, heptacosanedioic acid, octacosanedioic acid, nonacosanedioic acid, triacontanedioic acid and their unsaturated and branched analogues. The diols and diacids might also contain a heteroatom in the main chain like an oxygen, nitrogen or sulfur, for example 1,5-dioxapan-2-one.

Cyclic carbonic acid esters can also be used as monomer or as comonomer in combination with lactones, dilactones, hydroxyl acids, hydroxyacid esters or diols plus dicarboxylic acids or a combination of these monomers to form polycarbonates or poly(ester-co-carbonate)s with an average M/E of 10 or larger. Examples of cyclic carbonic acid esters are trimethylene carbonate and decamethylene carbonate.

Instead of a combination of one or more diol and diacid, cyclic dilactones can also be added to produce AABB copolyesters with the desired M/E, which is 10 or higher. Typical examples of cyclic dilactones are: ethylene adipate, ethylene brassylate, butylene adipate.

Another type of polyester copolymers include AB/AABB copolyesters prepared of a combination of lactones and dilactones and/or the combination of $C_2$-$C_{30}$ diols and $C_2$-$C_{32}$ diacids, which result in polyesters having an average M/E of at least 10. The lactones, dilactones, diols and diacids can be selected from the lists given above.

Preferably the polyester or copolyester is selected from polytetradecalactone, polypentadecalactone, polyhexadecalactone, poly(caprolactone-co-pentadecalactone), poly(ε-decalactone-co-pentadecalactone), poly(ethylene brassylate-co-pentadecalactone), poly[ethylene-1,19-nonadecanedioate], poly[ethylene-1,23-tricosanedioate], poly[propylene-1,19-nonadecanedioate], poly[propylene-1,23-tricosanedioate], poly[1,4-butadiyl-1,19-nonadecanedioate], poly[1,4-butadiyl-1,23-tricosanedioate], poly[1,6-hexadiyl-1,19-nonadecanedioate], poly[1,6-hexadiyl-1,23-tricosanedioate], poly[1,19-nonadecadiyl-1,19-nonadecanedioate], poly[1,19-nonadecadiyl-1,23-tricosanedioate], poly[1,23-tricosadiyl-1,19-nonadecanedioate], poly[1,23-tricosadiyl-1,23-tricosanedioate], poly[1,20-icosadiyl-1,20-icosa-nedioate], poly[1,6-hexadiyl-1,20-icosenedionate], poly[propylene-1,20-icosanedionate].

More in general the polyester or copolyester is of general structure

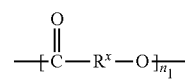

wherein $R^x$ is an organic group, preferably an aliphatic group having an average chain length of at least 10 carbon atoms and $n_1$ is the number of repeating units, which generally is at least 25, such as at least 50, such as at least 100. Practical maximum number of repeating units can be 2000 or 1000.

Organic group $R^x$ is a branched or straight hydrocarbon group optionally containing one or more heteroatoms provided that the atom neighboring the —O— is a carbon atom, i.e. not a heteroatom. $R^x$ may contain one or more unsaturations, like —C═C—. Preferably $R^x$ is a branched or straight hydrocarbon group, more preferably $R^x$ is a branched or straight aliphatic group. $R^x$ is preferably a saturated aliphatic group. In that respect the term chain length as used herein refers to the shortest number of atoms between two ester functionalities (O═)C—O—. Hence the "chain length" does not include any optional branches or side groups. For example, if $R^x$ is ($C_4H_8$) the chain length is four. Similarly, if $R^x$ is $CH_2$—$C(CH_3)_2$—$CH_2$—$CH_2$ the chain length is also four. In the general formula above Rx may be the same or different throughout the polyester provided the average chain length is at least 10 carbon atoms. The following general (co)polyester structures can be considered, which structures are to be considered as more detailed embodiments of the general structure provided above:

AB type copolyester

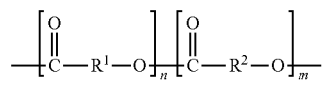

AABB type copolyester

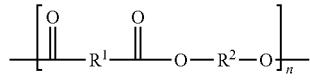

AABB type copolyester

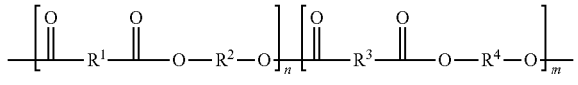

-continued

AB-AABB copolyester

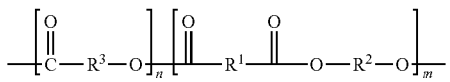

The chain lengths of $R^1$, $R^2$, $R^3$ and $R^4$ are selected such that for the polyester the M/E ratio is at least 10. The description for $R^x$ above also applies for $R^1$-$R^4$.

The M/E ratio should not be too high as otherwise the polyester may be absorbed to a large extent by the polyethylene phase leaving less polyester available to serve as compatibiliser at the interface of the polyethylene and polypropylene phases. Accordingly it is preferred that the M/E ratio is at most 32. Hence the M/E ratio is preferably from 10-32, more preferably from 12-24.

The molecular weight of the polyester may vary and is generally selected such that a material is obtained that can be blended with the polyethylene relatively easily.

The number average molecular weight is preferably from 5000 to 250000 g/mol, more preferably from 10000 to 100000 g/mol, said number average molecular weight being determined as the polyethylene-equivalent molecular weight by high temperature size exclusion chromatography performed at 160° C. in trichlorobenzene using polyethylene as standard.

Polyester—Method

The polyester may be manufactured by various methods known in the art.

For example, the polyesters may be prepared by enzymatic ring-opening polymerization, catalytic ring-opening polymerization using organic catalysts, (3) anionic ring-opening polymerization and catalytic ring-opening polymerization using metal-based catalysts, (4) ADMET (acyclic diene metathesis) or ROMP (ring-opening metathesis) of ester containing dienes or unsaturated cyclic esters, respectively or (5) polycondensation.

Enzymatic ring-opening polymerization of cyclic esters, in particular macrolactones (lactones with a ring size larger than 10 atoms) has proven to be a very efficient process. For example Novozyme 435, containing supported *Candida antarctica* lipase B can polymerize pentadecalactone within 2 h at 70° C. with over 90% conversion to high molecular weight ($M_n$ 86,000 g/mol) polypentadecalactone (Bisht, K. S.; Henderson, L. A.; Gross, R. A.; Kaplan, D. L.; Swift, G. *Macromolecules* 1997, 30, 2705-2711; Kumar, A.; Kalra, B.; Dekhterman, A.; Gross, R. A. *Macromolecules* 2000, 33, 6303-6309). Supported *Humicola insolenscutinase* gave comparable results for pentadecalactone polymerization (Hunson, M.; Abul, A.; Xie, W.; Gross, R. *Biomacromolecules* 2008, 9, 518-522).

Organic catalysts such as 1,5,7-triazabicyclo[4.4.0]dec-5-ene (TBD) selectively ring-open lactones and macrolactones such as pentadecalactone to the corresponding homo and copolymers. Although the conversions are high, in all reported cases the obtained molecular weights of the products remain relatively low (Bouyahyi, M.; Pepels, M. P. F.; Heise, A.; Duchateau, R. *Macromolecules* 2012, 45, 3356-3366).

The most well-known route to produce high molecular weight polymacrolactones and lactone-macrolactone copolymers is by anionic or catalytic ring-opening polymerization using metal-based catalysts. A wide variety of catalysts have been applied. Aluminum salen (WO 2012/065711, van der Meulen, I.; Gubbels, E.; Huijser, S.; Sablong, R.; Koning, C. E.; heise, A.; Duchateau, R. *Macromolecules* 2011, 44, 4301-4305) and zinc phenoxyimine (WO 2014/188344; Bouyahyi, M.; Duchateau, R. *Macromolecules* 2014, 47, 517-524; Jasinska-Walc, L.; Hansen, M. R.; Dudenko, D.; Rozanski, A.; Bouyahyi, M.; Wagner, M.; Graf, R.; Duchateau, R. *Polym. Chem.* 2014, 5, 3306-3320) catalysts are among the most active catalysts known for the ring-opening polymerization of macrolactones producing high molecular weight homo- and copolymers. Besides discrete catalysts consisting of a complex ancillary ligand system, simple metal alkoxides can also be applied. For example KOtBu and $Mg(BHT)_2THF_2$ proved to be potent catalysts/initiators for the ring-opening polymerization of lactones and macrolactones (Jedliński, Z.; Juzwa, M.; Adamus, G.; Kowalczuk, M.; Montaudo, M. *Macromol. Chem. Phys.* 1996, 197, 2923-2929; Wilson, J. A.; Hopkins, S. A.; Wright, P. M.; Dove, A. P. *Polym. Chem.* 2014, 5, 2691-2694; Wilson, J. A.; Hopkins, S. A.; Wright, P. M.; Dove, A. P. *macromolecules* 2015, 48, 950-958).

ADMET and ROMP are interesting methodologies to produce polyesters with high M/E values. The difference between ADMET and ROMP is that the first is a step growth process whereas the latter is a chain growth process. Though, but methods have resulted in polyesters with a significantly high molecular weight. The disadvantage of olefin metathesis is that to obtain the final saturated product, a hydrogenation step is necessary. The process is also rather costly (Fokou, P. A.; Meier, M. A. R. *Macromol. Rapid. Commun.* 2010, 31, 368-373; Vilela, C.; Silvestre, A. J. D.; Meier, M. A. R. *Macromol. Chem. Phys.* 2012, 213, 2220-2227; Pepels, M. P. F.; Hansen, M. R.; Goossens, H.; Duchateau, R. *Macromolecules* 2013, 46, 7668-7677).

Polycondensation of ω-hydroxy fatty acids or ω-hydroxy fatty acid esters has been reported using either enzymes or metal-based catalysts. For example *Candida antarctica* lipase B (Novozyme 435) polymerizes ω-hydroxy fatty acids, such as 12-hydroxydodecanoic acid, albeit that degrees of polymerization remain rather low (Mahapatro, A.; Kumar, A.; Gross, R. A. *Biomacromolecules* 2004, 5, 62-68). The same enzyme was also used to copolymerize fatty acid-based diacids with diols to moderately high molecular weight polyesters (Yang, X.; Lu, W.; Zhang, X.; Xie, W.; Cai, M.; Gross, R. A. *Biomacromolecules* 2010, 11, 259-268). The titanium-catalyzed polycondensation of ω-hydroxy fatty acid esters proved to be highly efficient resulting in high molecular weight polyesters (Liu, C.; Liu, F.; Cai, J.; Xie, W.; Long, T. E.; Turner, S. R.; Lyons, A.; Gross, R. A. *Biomacromolecules* 2011, 12, 3291-3298).

Methods for making polyesters suitable for application in the present invention are further disclosed for example in WO 2012/065711, WO 2014/203209, WO 2014/147546, the contents of which are incorporated herein by reference.

Polyethylene

The polyethylene in the composition according to the present invention may be a very low density polyethylene (VLDPE), linear low density polyethylene (LLDPE), low density polyethylene (LDPE), medium density polyethylene (MDPE), high density polyethylene (HDPE). The polyethylene may also be a mixture of at least two or at least two types of the foregoing polyethylenes. For example the polyethylene may be a mixture of LLDPE and LDPE or it may be a mixture of two different types of LDPE.

The terms VLDPE, LDPE, LLDPE, MDPE and HDPE are known in the art.

Very low density polyethylene (VLDPE) generally means polyethylene with a density of less than 915 kg/m³. Linear low density polyethylene and low density polyethylene means polyethylene with a density of from 915 to 935 kg/m³. High density polyethylene means polyethylene with a density of more than 935 kg/m³.

Preferably the melt flow rate of the polyethylene is from 0.1-100 g/10 min as measured in accordance with ISO 1133 (2.16 kg, 190° C.).

Polypropylene

The polypropylene in the composition may be:
one or more of a propylene homopolymer,
one or more of a propylene-α-olefin random copolymer, preferably a propylene ethylene or a propylene $C_4$-$C_8$ α-olefin random copolymer,
one or more of a propylene-α-olefin block copolymer,
one or more of a heterophasic polypropylene copolymer comprising a matrix phase and a disperse phase, the matrix phase consisting of a propylene homopolymer and/or a propylene copolymer with up to 3 wt. % of ethylene and/or at least one $C_4$-$C_8$ α-olefin, the wt. % being based on the matrix phase, and the disperse phase consisting of an ethylene-$C_3$-$C_8$ α-olefin copolymer,
a mixture of any of the foregoing polypropylenes.

Isotactic polypropylene is preferred.

If the polypropylene is a heterophasic copolymer it is preferred that the matrix phase is a propylene homopolymer of a propylene-ethylene copolymer with up to 3 wt. % of ethylene and further that the disperse phase is an ethylene propylene copolymer with from 20-80 wt % of propylene and 80-20 wt. % of ethylene, the wt. % based on the disperse phase.

The polypropylene is preferably a propylene homopolymer or a propylene ethylene or a propylene $C_4$-$C_8$ α-olefin random copolymer. The random copolymer contains at most 5 wt. %, on the basis of the copolymer, of said ethylene or α-olefin. The random copolymer is preferably a propylene-ethylene random copolymer.

Preferably the melt flow rate of the polypropylene is from 0.1-100 g/10 min as measured in accordance with ISO 1133 (2.16 kg, 230° C.). More preferably the melt flow rate is from 5.0 to 60 g/10 min.

Composition

The amounts of polypropylene and polyethylene in the composition may vary within wide limits. The amount of polypropylene may vary from 5-95 wt. % on the basis of the total amount of polyethylene and polypropylene. Preferably the amount of polypropylene is from 20-90 wt. %, 40-90 wt. %, 50-90 wt. % on the basis of the total amount of polyethylene and polypropylene. Accordingly the amount of polyethylene may vary from 95-5 wt. % on the basis of the total amount of polyethylene and polypropylene. Preferably the amount of polyethylene is from 80-10 wt. %, 60-10 wt. %, 50-10 wt. % on the basis of the total amount of polyethylene and polypropylene. In an embodiment the amount of polypropylene is from 60-90 wt. % and the amount of polyethylene from 40-10 wt. % on the basis of the total amount of polyethylene and polypropylene.

The melt flow rates of the compatibiliser, polypropylene and polyethylene are selected such that homogeneous blends can be prepared using common melt blending techniques, such as extrusion or internal mixing. In this respect a homogeneous blend means a blend wherein the polyethylene and polypropylene concentrations are substantially constant throughout the material, even though the polyethylene may form a disperse phase in the polypropylene matrix or vice versa. The compatibiliser needs to have a melt flow such that during the melt processing of the composition the compatibiliser can migrate, at least in part, to the interface of the polyethylene and polypropylene phase.

A preferred method of manufacture of the composition comprises the steps of
Preparing a masterbatch by melt mixing the polymer that will form the disperse phase in the composition and the compatibiliser,
Melt mixing the masterbatch so obtained with the polymer that will form the matrix phase in the composition.

In this method it is preferred that a major part, preferably substantially all, of the compatibiliser is contained in the masterbatch and that a minor part, preferably substantially none, of compatibiliser is added during the melt mixing so as to form the composition. That is, during the step of preparing the masterbatch from 80-100% of the total amount of compatibiliser is added to the masterbatch and 0-20% of the total amount of compatibiliser is added during the step of preparing the composition from the masterbatch and the polymer that will form the matrix phase in the composition.

This method has the advantage that the compatibiliser is more effective resulting in optimised properties of the composition.

Accordingly the melt flow rate of the compatibiliser is preferably similar to the melt flow rate of the polymer forming the disperse phase. For example the ratio of melt flow rate of the polymer forming the disperse phase and the compatibiliser may range from 0.01-100, preferably from 0.05-50, more preferably from 0.1-10 even more preferably from 0.5-5, when measured under similar conditions.

The amount of compatibiliser is from 0.1-10 wt. %, preferably from 0.5-10 wt. % such as from 2-10 wt. % or 3-8 wt. % on the basis of the sum of the amount of polypropylene and polyethylene.

In a preferred embodiment the invention relates to a composition comprising
70-90 wt. % of polypropylene based on the sum of the amounts of polyethylene and polypropylene,
10-30 wt. % polyethylene based on the sum of the amounts of polyethylene and polypropylene,
1-10 wt. % compatibiliser based on the sum of the amounts of polyethylene and polypropylene,
wherein the polypropylene has a melt flow rate of from 1-20 the polyethylene is a low density polyethylene and having a melt flow rate of from 1-20 and the compatibiliser has a M/E ratio of from 10-32 and having a number average molecular weight of from 10000-100000 g/mol.

The composition may further contain additives common in the art such as dyes, pigments, antioxidants, ultra-violet stabilisers, infrared absorbers, flame retardants, mould release agents and the like. Such additives are comprised in an amount of up to about 5 wt. % on the basis of the weight of the composition.

The composition may also further comprise reinforcing agents like talc, glass fibres, glass flakes, glass platelets, organic fibres, carbon fibres, cellulosic fibres and the like. Talc and or glass fibres being preferred. The amount of reinforcing agent is from 1-20 wt. % on the basis of the weight of the composition.

A skilled person will understand that the composition according to the invention is a thermoplastic composition.

Articles

The present invention further relates to articles comprising the composition as disclosed herein. The present invention further relates to articles manufactured from the composition as disclosed herein. Generally the composition is converted into an article using a moulding technique such as injection moulding, extrusion moulding, blow moulding and compression moulding. Accordingly the present invention also relates to an article obtained by moulding the composition according to the present invention. It is also possible to manufacture profiles or tubes by means of profile or tube extrusion.

In the article obtained by moulding or extrusion a part of the polyester co-crystallised and/or epitaxially crystallised in the polyethylene phase and another part entangled in the polypropylene phase.

Articles may be automotive interior articles, automotive exterior articles, household appliances, pipes, films, sheets, containers, water containers, infuse bags.

Use

In another aspect the present invention relates to the use of a non-aromatic polyester having an average M/E ratio of at least 10, wherein M is the number of backbone carbon atoms in the polyester not including the carbonyl carbons and E is the number of ester groups in the polyester as a compatibiliser in a blend of polypropylene and polyethylene. The preferred embodiments as set out herein for the composition likewise apply to this use.

The invention will now be further explained on the basis of the following non-limiting examples.

EXAMPLE 1

Typical Procedure for Synthesis of PPDL.

A glass crimp cap vial was charged with toluene (1.0 mL), PDL (0.500 g, 2.08 mmol), benzyl alcohol (0.22 mg, 2.08 µmol) and catalyst 1 (0.73 mg, 2.08 µmol).

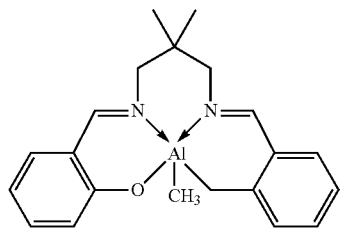

Catalyst 1

All manipulations were carried out in the glovebox. Then, the mixture was removed from the glovebox and stirred in an oil bath at 100° C. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Table 1, entry 1 specifies the reaction conditions, molecular weight ($M_n$ and $M_w$), PDI (polydispersity $M_w/M_n$) and the PDL conversion.

TABLE 1

Ring-opening polymerization of PDL mediated by catalyst 1 and benzyl alcohol as an initiator.

| entry | catalyst | mon/cat/init | time [h] | $M_n$ [g/mol] | $M_w$ [g/mol] | PDI | conv. [%] |
|---|---|---|---|---|---|---|---|
| 1 | 1 | 1000/1/1 | 5 | 35100 | 56800 | 1.6 | 19 |
| 2 | 1 | 500/1/1 | 5 | 40600 | 79000 | 2.0 | 66 |
| 3 | 1 | 250/1/1 | 5 | 32000 | 59600 | 1.9 | 96 |
| 4 | 1 | 1000/1/1 | 24 | 70800 | 181200 | 2.6 | 82 |
| 5 | 1 | 500/1/1 | 24 | 75400 | 146200 | 1.9 | 95 |
| 6 | 1 | 250/1/1 | 24 | 29700 | 58700 | 2.0 | 96 |
| 7 | 1 | 500/1/0.5 | 5 | 90100 | 176800 | 2.0 | 50 |
| 8 | 1 | 1000/1/0.5 | 24 | 115100 | 232700 | 2.0 | 82 |

TABLE 1-continued

Ring-opening polymerization of PDL mediated by catalyst 1 and benzyl alcohol as an initiator.

| entry | catalyst | mon/cat/init | time [h] | $M_n$ [g/mol] | $M_w$ [g/mol] | PDI | conv. [%] |
|---|---|---|---|---|---|---|---|
| 9 | 1 | 500/1/0.5 | 24 | 79800 | 156000 | 2.0 | 97 |
| 10 | 1 | 250/1/0.5 | 24 | 54900 | 123000 | 2.2 | 97 |

EXAMPLE 2

Typical Procedure for Synthesis of PPDL.

A glass crimp cap vial was charged with toluene (1.0 mL), PDL (0.500 g, 2.08 mmol), benzyl alcohol (0.22 mg, 2.08 µmol) and catalyst 2 (1.26 mg, 2.08 µmol).

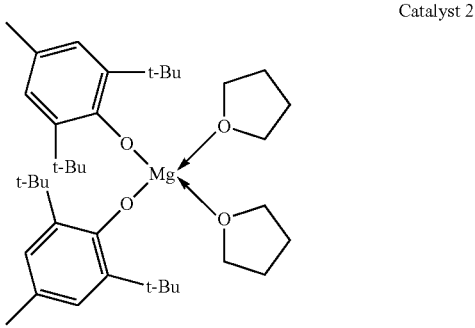

Catalyst 2

All manipulations were carried out in the glovebox. Then, the mixture was removed from the glovebox and stirred in an oil bath at 100° C. The progress of the reaction was followed by 1H NMR spectroscopy by taking aliquots at set time intervals. The synthesized copolymer was cooled to room temperature and quenched using acidified methanol, isolated and dried in vacuum at room temperature for 18 h. Table 2, entry 11 specifies the reaction conditions, molecular weight ($M_n$ and $M_w$), PDI and the PDL conversion.

TABLE 2

Ring-opening polymerization of PDL mediated by catalyst 2 and benzyl alcohol as an initiator.

| entry | catalyst | mon/cat/init | time [h] | $M_n$ [g/mol] | $M_w$ [g/mol] | PDI | conv. [%] |
|---|---|---|---|---|---|---|---|
| 11 | 2 | 1000/1/1 | 24 | 63100 | 123800 | 2.0 | 88 |
| 12 | 2 | 500/1/1 | 24 | 43500 | 85600 | 2.0 | 97 |
| 13 | 2 | 250/1/1 | 24 | 18200 | 38600 | 2.1 | 99 |
| 14 | 2 | 500/1/0.5 | 5 | 48100 | 91900 | 1.9 | 95 |
| 15 | 2 | 1000/1/0.5 | 24 | 63500 | 127600 | 2.0 | 81 |
| 16 | 2 | 500/1/0.5 | 24 | 39900 | 89500 | 2.2 | 95 |
| 17 | 2 | 250/1/0.5 | 24 | 23300 | 45800 | 2.0 | 93 |

EXAMPLE 3

Typical Procedure for Synthesis of PPDL.

A glass crimp cap vial was charged with toluene (1.0 mL), PDL (0.500 g, 2.08 mmol), benzyl alcohol (0.22 mg, 2.08 µmol) and catalyst 3 (1.45 mg, 2.08 µmol).

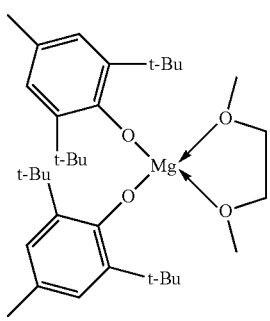

Catalyst 3

All manipulations were carried out in the glovebox. Then, the mixture was removed from the glovebox and stirred in an oil bath at 100° C. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Table 3, entry 18 specifies the reaction conditions, molecular weight ($M_n$ and $M_w$), Đ and the PDL conversion.

TABLE 3

Ring-opening polymerization of PDL mediated by catalyst 3 and benzyl alcohol as an initiator.

| | Catalyst | mon/cat/init | time [h] | $M_n$ [g/mol] | $M_w$ [g/mol] | PDI | conv. [%] |
|---|---|---|---|---|---|---|---|
| 18 | 3 | 1000/1/1 | 0.5 | 43200 | 86400 | 2.0 | 22 |
| 19 | 3 | 500/1/1 | 0.5 | 40100 | 84200 | 2.1 | 76 |
| 20 | 3 | 250/1/1 | 0.5 | 13700 | 31500 | 2.3 | 96 |
| 21 | 3 | 1000/1/1 | 1 | 41500 | 83000 | 2.0 | 77 |
| 22 | 3 | 500/1/1 | 1 | 42400 | 84200 | 2.0 | 97 |
| 23 | 3 | 250/1/1 | 1 | 11200 | 28500 | 2.6 | 97 |
| 24 | 3 | 1000/1/1 | 2 | 27900 | 57900 | 2.1 | 81 |
| 25 | 3 | 500/1/1 | 2 | 23000 | 46400 | 2.0 | 96 |
| 26 | 3 | 250/1/1 | 2 | 11800 | 25300 | 2.1 | 97 |

EXAMPLE 4

Typical Procedure for the Preparation of the Uncompatibilized Blends.

Isotactic polypropylene (iPP) (SABIC PP575P, 8.0 g, MFI=10.5 g/10 min (230° C., 2.16 kg)), low density polyethylene (LDPE) (SABIC 2008TN00, 2.0 g, MFI=7.5 g/10 min (190° C., 2.16 kg)) were fed into the extruder chamber. The mixture was processed for 3 minutes at 190° C. with a screw rotation rate of 100 rpm. Afterwards the mixture was evacuated directly to a mini-injection moulding machine to prepare samples for mechanical properties and morphology analysis.

EXAMPLE 5

Typical Procedure for the Preparation of the Blends Compatibilised by PPDL.

Isotactic polypropylene (iPP) (PP575P, 8.0 g, MFI=10.5 g/10 min (230° C., 2.16 kg)), low density polyethylene (LDPE) (2008TN00, 2.0 g, MFI=7.5 g/10 min (190° C., 2.16 kg)) and the PPDL (0.5 g, $M_n$=24.3 kg·mol$^{-1}$, Đ=2.2) were fed into the extruder chamber. The mixture was processed for 3 minutes at 190° C. with a screw rotation rate of 100 rpm. Afterwards the mixture was evacuated directly to a mini-injection moulding machine to prepare samples for mechanical properties and morphology analysis.

Measurements $^1$H NMR analysis carried out at 80-110° C. using deuterated tetrachloroethene (TCE-d$_2$) as the solvent and recorded in 5 mm tubes on a Varian Mercury spectrometer operating at frequencies of 400 MHz. Chemical shifts are reported in ppm versus tetramethylsilane and were determined by reference to the residual solvent.

Size exclusion chromatography (SEC) was performed at 160° C. on a Polymer Laboratories PLXT-20 Rapid GPC Polymer Analysis System (refractive index detector and viscosity detector) with 3 PLgel Olexis (300×7.5 mm, Polymer Laboratories) columns in series. 1,2,4-Trichlorobenzene was used as eluent at a flow rate of 1 mL·min$^{-1}$. The molecular weights were calculated with respect to polyethylene standards (Polymer Laboratories). A Polymer Laboratories PL XT-220 robotic sample handling system was used as autosampler.

TEM analysis. The samples were trimmed at low temperature (−140° C.) and subsequently stained for 24 h with a RuO4 solution. Ultrathin sections (70 nm) were obtained at −100° C. using a Leica Ultracut S/FCS microtome. The sections were placed on a 200 mesh copper grid with a carbon support layer. The sections were examined in a Tecnai 20 transmission electron microscope, operated at 200 kV.

FIGS. 1-3 show TEM pictures of some blends.

FIG. 1a shows a blend of PP with PPDL in an 80/20 mixture; the black bar at the bottom left of the figure represents 0.2 micrometer.

Figure 1B:
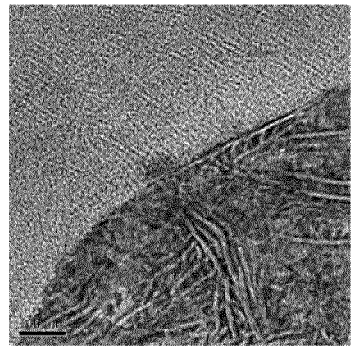
FIG. 1b shows a blend of PP with PPDL in an 80/20 mixture.

FIG. 1b shows a blend of PP with PPDL in an 80/20 mixture; the black bar at the bottom left of the figure represents 100 nm.

Figure 1C:
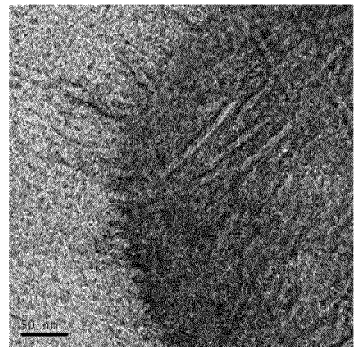
FIG. 1c shows a blend of PP with PPDL in an 80/20 mixture.

FIG. 1c shows a blend of PP with PPDL in an 80/20 mixture; the black bar at the bottom left of the figure represents 50 nm.

Figure 2A:
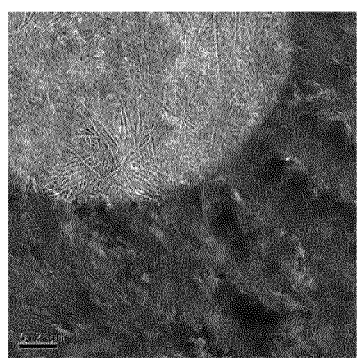
FIG. 2a shows a blend of LDPE with PPDL in an 80/20 mixture.

FIG. 2a shows a blend of LDPE with PPDL in an 80/20 mixture; the black bar at the bottom left of the figure represents 0.2 micrometer.

Figure 2B:
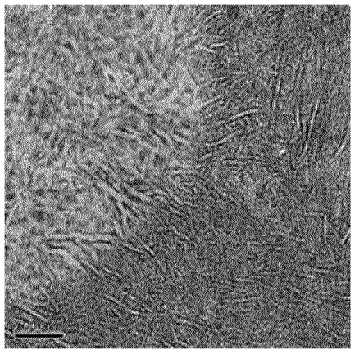
FIG. 2b shows a blend of LDPE with PPDL in an 80/20 mixture.

FIG. 2b shows a blend of LDPE with PPDL in an 80/20 mixture; the black bar at the bottom left of the figure represents 100 nm.

Figure 2C:
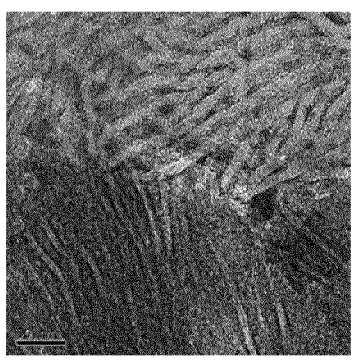
FIG. 2c shows a blend of LDPE with PPDL in an 80/20 mixture.

FIG. 2c shows a blend of LDPE with PPDL in an 80/20 mixture; the black bar at the bottom left of the figure represents 50 nm.

Figure 3A:
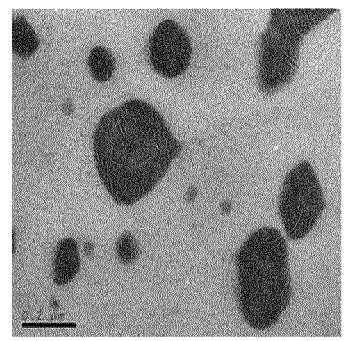
FIG. 3a shows a blend of PP and LDPE compatibilised with PPDL in an 80/20/5 mixture.

FIG. 3a shows a blend of PP and LDPE compatibilised with PPDL in an 80/20/5 mixture; the black bar at the bottom left of the figure represents 0.2 micrometer.

Figure 3B:
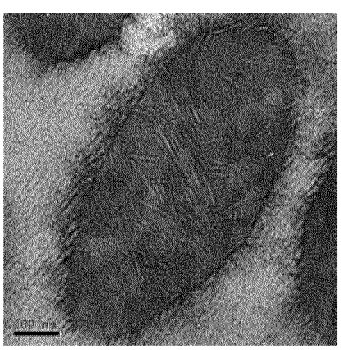
FIG. 3b shows a blend of PP and LDPE compatibilised with PPDL in an 80/20/5 mixture.

FIG. 3b shows a blend of PP and LDPE compatibilised with PPDL in an 80/20/5 mixture; the black bar at the bottom left of the figure represents 100 nm.

Figure 3C:
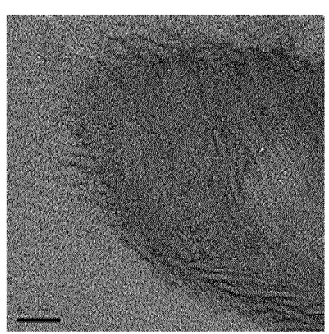
FIG. 3c shows a blend of PP and LDPE compatibilised with PPDL in an 80/20/5 mixture.

FIG. 3c shows a blend of PP and LDPE compatibilised with PPDL in an 80/20/5 mixture; the black bar at the bottom left of the figure represents 50 nm.

FIG. 1 shows that (see in particular FIG. 1c) at the interface between the PP and the PPDL there is some sort of transitioning from one phase to the other, indicative for interaction between the two materials.

FIG. 2 shows that (see in particular FIG. 2c) at least part of some crystals (lamella's) in one phase continue in the other phase, which is indicative for either co-crystallisation or for epitaxial crystallisation of the polyester onto the polyethylene.

In FIG. 3 the above observations are confirmed in that there is no strict interface between the polypropylene (light colour) and the polyethylene (dark color) phases, but rather that there is a gradual change from one phase to the other. The present inventors believe that this gradual change is the result of the compatibilising effect.

The invention claimed is:

1. A composition comprising polypropylene, polyethylene and a compatibiliser, wherein said compatibiliser is a non-aromatic polyester having an average M/E ratio of at least 10, wherein M is the number of backbone carbon atoms in the polyester not including the carbonyl carbons and E is the number of ester groups in the polyester.

2. The composition of any one or more of claim 1 wherein the polyester has an average M/E ratio of from 12-32.

3. The composition of claim 1 wherein the amount of polypropylene is from 5-95 wt. % on the basis of the total amount of polyethylene and polypropylene.

4. The composition of claim 1 wherein the amount of compatibiliser is from 0.5-10 wt. % on the basis of the sum of the amount of polypropylene and polyethylene.

5. The composition of claim 1 wherein said polypropylene is one or more of:
   a propylene homopolymer,
   a propylene-α-olefin random copolymer,
   a propylene-α-olefin block copolymer, and
   a heterophasic polypropylene copolymer comprising a matrix phase and a disperse phase, the matrix phase consisting of a propylene homopolymer and/or a propylene copolymer with up to 3 wt. % of ethylene and/or at least one $C_4$-$C_8$ α-olefin, the wt. % being based on the matrix phase, and the disperse phase consisting of an ethylene-$C_3$-$C_8$ α-olefin copolymer.

6. The composition of claim 1 wherein said polyethylene is a very low density polyethylene, linear low density polyethylene, low density polyethylene, high density polyethylene or a mixture of any of the foregoing polyethylenes.

7. The composition of claim 1 wherein the polyester has a number average molecular weight of from 5,000 to 250,000 g/mol.

8. The composition of claim 1 wherein the polyester is a polyester homopolymer or a polyester copolymer.

9. The composition of claim 1 wherein the polyester is one or more selected from the group consisting of polytetradecalactone, polypentadecalactone, polyhexadecalactone, poly(caprolactone-co-pentadecalactone), poly(ε-decalactone-co-pentadecalactone), poly(ethylene brassylate-co-pentadecalactone), poly[ethylene-1,19-nonadecanedioate], poly[ethylene-1,23-tricosanedioate], poly[propylene-1,19-nonadecanedioate], poly[propylene-1,23-tricosanedioate], poly[1,4-butadiyl-1,19-nonadecanedioate], poly[1,4-butadiyl-1,23-tricosanedioate], poly[1,6-hexadiyl-1,19-nonadecanedioate], poly[1,6-hexadiyl-1,23-tricosanedioate], poly[1,19-nonadecadiyl-1,19-nonadecanedioate], poly[1,19-nonadecadiyl-1,23-tricosanedioate], poly[1,23-tricosadiyl-1,19-nonadecanedioate], poly[1,23-tricosadiyl-1,23-tricosanedioate], poly[1,20-icosadiyl-1,20-icosanedioate], poly[1,6-hexadiyl-1,20-icosenedionate], and poly[propylene-1,20-icosanedionate].

10. The composition of claim 1 wherein the backbone of the polyester is a saturated backbone.

11. An article comprising the composition of claim 1.

12. The article of claim 11, said article being selected from the group consisting of automotive interior articles, automotive exterior articles, household appliances, pipes, films, sheets, containers, water containers, and infuse bags.

13. The composition of claim 5 wherein said polypropylene comprises a propylene ethylene or a propylene $C_4$-$C_8$ α-olefin random copolymer.

14. The composition of claim 1 wherein the polyester has a number average molecular weight of from 10,000 to 100,000 g/mol.

15. The composition of claim 1 wherein the polypropylene comprises isotactic polypropylene.

16. The composition of claim 4 comprising:
   70-90 wt. % of said polypropylene, based on the sum of the amount of polyethylene and polypropylene,
   10-30 wt. % of said polyethylene, based on the sum of the amount of polyethylene and polypropylene, and
   3-8 wt. % of said compatibiliser, based on the sum of the amount of polyethylene and polypropylene.

17. A composition comprising polypropylene, polyethylene and a compatibiliser, wherein said compatibiliser is a non-aromatic polyester having an average M/E ratio of 12-32, wherein M is the number of backbone carbon atoms in the polyester not including the carbonyl carbons and E is the number of ester groups in the polyester, and wherein the amount of polypropylene is from 5-95 wt. % and the amount of compatibiliser is from 5-10 wt. %, on the basis of the sum of the amount of polypropylene and polyethylene.

18. The composition of claim 17 wherein the polyester is one or more selected from the group consisting of polytetradecalactone, polypentadecalactone, polyhexadecalactone, poly(caprolactone-co-pentadecalactone), poly(ε-decalactone-co-pentadecalactone), poly(ethylene brassylate-co-pentadecalactone), poly[ethylene-1,19-nonadecanedioate], poly[ethylene-1,23-tricosanedioate], poly[propylene-1,19-nonadecanedioate], poly[propylene-1,23-tricosanedioate], poly[1,4-butadiyl-1,19-nonadecanedioate], poly[1,4-butadiyl-1,23-tricosanedioate], poly[1,6-hexadiyl-1,19-nonadecanedioate], poly[1,6-hexadiyl-1,23-tricosanedioate], poly[1,19-nonadecadiyl-1,19-nonadecanedioate], poly[1,19-nonadecadiyl-1,23-tricosanedioate], poly[1,23-tricosadiyl-1,19-nonadecanedioate], poly[1,23-tricosadiyl-1,23-tricosanedioate], poly[1,20-icosadiyl-1,20-icosa-nedioate], poly[1,6-hexadiyl-1,20-icosenedionate], and poly[propylene-1,20-icosanedionate].

19. The composition of claim 17 comprising:
   70-90 wt. % of said polypropylene, based on the sum of the amount of polyethylene and polypropylene,
   10-30 wt. % of said polyethylene, based on the sum of the amount of polyethylene and polypropylene, and
   3-8 wt. % of said compatibiliser, based on the sum of the amount of polyethylene and polypropylene.

20. The composition of claim 17 wherein the polypropylene comprises isotactic polypropylene.

* * * * *